(12) United States Patent
Freeman

(10) Patent No.: US 11,655,796 B1
(45) Date of Patent: May 23, 2023

(54) SUBMERSIBLE HYDRO POWER GENERATING SYSTEM

(71) Applicant: Walter B. Freeman, Cave Junction, OR (US)

(72) Inventor: Walter B. Freeman, Cave Junction, OR (US)

(*) Notice: Subject to any disclaimer, the term of this patent is extended or adjusted under 35 U.S.C. 154(b) by 0 days.

(21) Appl. No.: 17/883,204

(22) Filed: Aug. 8, 2022

Related U.S. Application Data

(60) Provisional application No. 63/308,828, filed on Feb. 10, 2022.

(51) Int. Cl.
F03B 13/10 (2006.01)
F03B 3/04 (2006.01)
F03B 13/22 (2006.01)
F03B 17/06 (2006.01)

(52) U.S. Cl.
CPC ........... *F03B 13/10* (2013.01); *F03B 3/04* (2013.01); *F03B 13/22* (2013.01); *F03B 17/061* (2013.01); *F03B 17/062* (2013.01)

(58) Field of Classification Search
CPC .. F03B 13/10; F03B 3/04; F03B 13/22; F03B 17/061; F03B 17/062
USPC .............................. 60/398; 290/42, 43, 53, 54
See application file for complete search history.

(56) References Cited

U.S. PATENT DOCUMENTS

| 1,025,929 | A | | 5/1912 | Snook | |
|---|---|---|---|---|---|
| 3,757,721 | A | * | 9/1973 | Ohishi | A63B 35/12 114/338 |
| 4,500,259 | A | | 2/1985 | Schumacher | |
| 4,849,647 | A | | 7/1989 | Curtis | |
| 5,937,644 | A | * | 8/1999 | Dipnail | F03B 3/121 416/240 |
| 7,500,442 | B1 | * | 3/2009 | Schanz | B63G 8/42 114/256 |
| 7,911,074 | B2 | | 3/2011 | Scott | |
| 8,344,535 | B2 | | 1/2013 | Pitre | |
| 10,029,773 | B1 | * | 7/2018 | Todter | B63H 9/061 |
| 2012/0119510 | A1 | * | 5/2012 | Herzen | F03D 15/10 290/55 |
| 2014/0219776 | A1 | | 8/2014 | Trayner et al. | |

(Continued)

FOREIGN PATENT DOCUMENTS

DE 4139134 12/1997
DE 10311504 9/2004

(Continued)

*Primary Examiner* — Hoang M Nguyen
(74) *Attorney, Agent, or Firm* — Jerry Haynes Law

(57) ABSTRACT

A hydro power generating system and device is configured to generate electrical power from the movement of water. The device consists of an elongated cylindrical hull to which comprises of a helical screw attached around the outer surface of a hull of the device. Movement of water over the screw causes the hull to rotate. The power created by the rotation of the hull is transferred to a generator located in the hull interior. The hull also contains water ballast tanks and a compressed air source in an air tank allowing adjusting the buoyancy of the device. The system is configured to couple adjacent devices in an array that can extend longitudinally, laterally and/or vertically via a common frame. At least a pair of counter-rotating screws is attached to a common frame, wherein the entire assembly of the system is anchored in flowing water.

20 Claims, 4 Drawing Sheets

(56) References Cited

U.S. PATENT DOCUMENTS

2018/0305226 A1* 10/2018 Simpson .................. C02F 1/325
2020/0024814 A1*  1/2020 Posada Gonzalez ..... F03B 7/00

FOREIGN PATENT DOCUMENTS

| DE | 102018002866 | 10/2019 |
| EP | 0222352 | 5/1987 |
| EP | 2003332 | 12/2008 |
| RU | 2760402 | 11/2021 |
| WO | WO200659094 | 6/2006 |
| WO | WO2006059094 | 6/2006 |
| WO | WO2012019307 | 2/2012 |

* cited by examiner

SUBMERSIBLE HYDRO POWER GENERATING SYSTEM

CROSS-REFERENCE TO RELATED APPLICATIONS

This application claims priority from U.S. Provisional Application Ser. No. 63/308,828, entitled "Submersible Hydro Power Generating System", filed on Feb. 14, 2022, which application is hereby incorporated herein by reference in its entirety.

FIELD OF THE INVENTION

The present invention relates generally to a hydro power generating system and device. More so, the present invention relates to a hydro power generating system and device using one or more Archimedes type screws.

BACKGROUND OF THE INVENTION

The following background information may present examples of specific aspects of the prior art (e.g., without limitation, approaches, facts, or common wisdom) that, while expected to be helpful to provide additional aspects of the prior art, is not to be construed as limiting the present invention, or any embodiments thereof, to anything stated or implied therein or inferred thereupon.

Typically, a system for generating electricity from flowing fluids has a turbine that is operatively connected to a generator by a rotatable shaft. The turbine is often placed within the current of the flowing fluid, such as water or wind and as the current flows or passes by the turbine, the turbine is caused to rotate. The rotational movement of the turbine is mechanically transferred to the generator through the rotatable shaft or flexible cable where the mechanical energy can be converted into electrical energy. Electrical energy generated can then be transferred to a commercial power grid, transferred directly to electrically powered equipment, or stored in batteries for future use.

It is known to have multiple turbines operatively connected to a single generator or have multiple turbines each operatively connected to its own generator for generating electrical power.

Hydro-electric generators typically have a submerged or semi-submerged turbine, such as a propeller that is placed within a flowing body of water and are usually oriented to be directly in line with the direction of flow of the water or current. That is, a rotational axis of the turbine is substantially parallel and in-line with the direction of flow of the current.

Numerous attempts have been made and several prior art devices are known for variety of Hydro-electric generators. Even though these innovations may be suitable for the specific purposes to which they address, however, they would not be as suitable for the purposes of the present invention.

For example, PCT Publication No. WO2012019307A1 to Sinclaire discloses a helical turbine that is operatively connected to at least one generator system for generating electrical power. System performance is optimized by controlling the operative angle between the longitudinal axis of the turbine and the direction of the current flow and by controlling a pitch ratio of the turbine.

For example, PCT Publication No. WO2009093909A1 to Eielsen relates to a turbine arrangement for extracting energy from flowing water, the turbine arrangement comprises at least two parallel screw turbines with a suspension means, buoyancy element and bottom mount, and necessary transmission elements for transmitting energy to a power machine.

For example, PCT Publication No. WO2006059094A1 to Bowie describes an apparatus for the generation of electrical or mechanical energy from a flowing fluid, wherein the apparatus comprises at least one helical blade facilitates its rotation when fluid flows on it to generate said electrical or mechanical energy.

For example, U.S. Pat. No. 8,344,535 to Pitre teaches a buoyant platform-like device for generating electricity from moving fluids having at least two fluid turbines coupled to one another through a frame. The fluid turbines having helicoid flights (screw-like threads) are adapted to rotate in opposite directions. The platform may additionally support a wind turbine.

For example, U.S. Pat. No. 7,911,074 to Anderson relates to a helical auger turbine includes a generally helical turbine blade rotatably mounted on a central shaft for use with electrical generators for producing electricity. An electrical generator may be powered by the helical auger turbine that can be used in a tidal water flow.

For example, U.S. Pat. No. 4,849,647 to McKenzie discloses a floating water turbine for taking the kinetic energy from linear current flow and converting it into mechanical energy and subsequently into electrical energy.

For example, U.S. Pat. No. 4,500,259 to Schumacher describes a fluid flow energy converter to extract energy from a free-stream fluid flow of wind or water by means of a multi-turn helicoids structure with a relatively small pitch angle.

For example, U.S. Pat. No. 1,025,929 to Snook teaches a wave motor comprising a screw having anchored supports for its ends, said screw being arranged to be operated upon by the movement of the waves of the ocean.

For example, Russian Pat. No. RU2760402 to Ilich discloses an auger mini-hydroelectric power station that contains two augers installed on the base with opposite twist of spiral blades on their shafts, a reducer, and an electric generator.

For example, European Pat. No. EP0222352 to Dauenhauer teaches an electric-current-generating hydraulic device having at least two parallel flooded screw turbines and a generator to generate electric-current from flow of river water.

For example, U.S. Pat. Application No. 2014/0219776 to Trayner et al. describes an arrangement for extracting energy from flowing liquid, such as tidal flows, oceanic currents and water flowing in rivers. The arrangement comprises at least one helical turbine pivotally connected to a support device. Various flow guiding devices also contribute to stability and performance of the arrangement.

It is apparent now that numerous innovations that are adapted to a variety of hydro power generating system have been developed in the prior art that are adequate for various purposes. Furthermore, even though these innovations may be suitable for the specific purposes to which they address, accordingly, they would not be suitable for the purposes of the present invention as heretofore described. Thus, a buoyancy adjustability submersible hydro power generating system that is configured to work in the direction of fluid flow. The present submersible hydro power generating system provides a system that is relatively easy to construct, install, adjust, remove, maintain, and economically operate."

SUMMARY OF THE INVENTION

The invention embodies a device and systems that uses a submersible modified Archimedes type screw to produce power/electrical energy.

The purpose of the invention is to provide dependable sustainable electric or mechanical power by utilizing energy developed by the movement of water i.e., streams, rivers, tidal flow, or ocean currents. In the case of stream and/or river installation, the device can be adapted to power a pump to transfer water via pipe or tube installations.

The present invention relates generally to a device that consists of an elongated cylindrical hull to which flights of a helical screw such as a typical Archimedes screw are attached, ringing the outer surface of the hull. Movement of water against the screw causes the hull to rotate. The design of the screw (i.e., the diameter of the hull and screw flights and spacing/pitch of the flight) will be specific to the volume and flow rate and depth of water in each application/installation. The power created by the rotation of the hull is transferred to a generator affixed to a central shaft located in the hull interior. The hull also contains water ballast tanks and a compressed air source so that the buoyancy of the mechanism is adjustable. Pairs of counter-rotating screws are attached to a common frame. The entire assembly is anchored and/or tethered in flowing water.

One objective of the present invention is to provide a hydro power generating device and system that generates electrical power from the movement of water.

Another objective of the present invention is to provide a hydro power generating device and system that can be adapted for use in a number of applications based on water flow; streams, rivers, canals, tidal flows, and ocean currents.

Another objective of the present invention is to provide a hydro power generating device and system that is relatively simple, economical, and easy to construct and operate.

Another objective of the present invention is to provide a hydro power generating device and system that is easy to install, remove and maintain as only an anchor point or tethering system is sufficient to facilitate its quick and easy installation.

Another objective of the present invention is to provide a hydro power generating device and system that is configured to be coupled to adjacent units in an array that can extend longitudinally, laterally and/or vertically.

Another objective of the present invention is to provide a hydro power generating device and system that is configured to produce electrical power from water, alternatively flowing in opposite directions (tidal flow).

Another objective of the present invention is to provide a hydro power generating device and system that is not harmful to aquatic life while generating hydro power.

Another objective of the present invention is to provide a hydro power generating device and system that utilizes a submersible Archimedes type screw which can be rendered positively or negatively buoyant by adjustment of the interior water ballast tank(s) and air tank(s).

Another objective of the present invention is to provide a hydro power generating device and system that uses a generator located in the sealed interior of the hull to generate electrical power.

Another objective of the present invention is to provide a hydro power generating device and system that uses a generator which also acts as a pump when connected with external power it allows the device to power a pump to deliver water to another location for irrigation purpose or the like.

Another objective of the present invention is to provide a hydro power generating device and system that uses stabilizer fins to stabilize horizontal and/or vertical movement of the device and the system to stabilize oscillation of the hull(s).

Another objective of the present invention is to provide a hydro power generating device and system that is fully submersible, which allows maximum force of the stream flow to be applied to the device or system, optimizing its power generation potential.

Another objective of the present invention is to provide a hydro power generating device and system comprising one or more hulls that are configured to increases water flow velocity relative to the velocity of the nominal stream flow.

Another objective of the present invention is to provide a hydro power generating device and system comprising the helical screw attached to the hull includes a turbulence reduction ring, wherein the turbulence reduction ring guides the flow of water, and it also serves to reduce the risk of harm to aquatic life Another objective of the present invention is to provide a hydro power generating device and system that has adjustable fins, air tank and water ballast tank to adjust buoyancy of the device, thereby allowing the device and the system to be floated from shore to the installation site.

Another objective of the present invention is to provide a hydro power generating device and system employs a relatively simple anchor and tether system.

Another objective of the present invention is to provide a hydro power generating device and system can be utilized to produce power in a number of stream flow systems, including rivers, canals, tidal flows, and ocean currents.

Another objective of the present invention is to provide a hydro power generating device and system when submerged, eliminates negative impacts to scenic values.

Another objective of the present invention is to provide a hydro power generating device and system is configured to operate submerged at a depth below possible contact with surface water craft.

Another objective of the present invention is to provide a hydro power generating device and system comprises automatically operated stabilizing fins that serve to keep the device in alignment for optimal power generation.

These and other objectives, advantages and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A to FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Figure 1A:
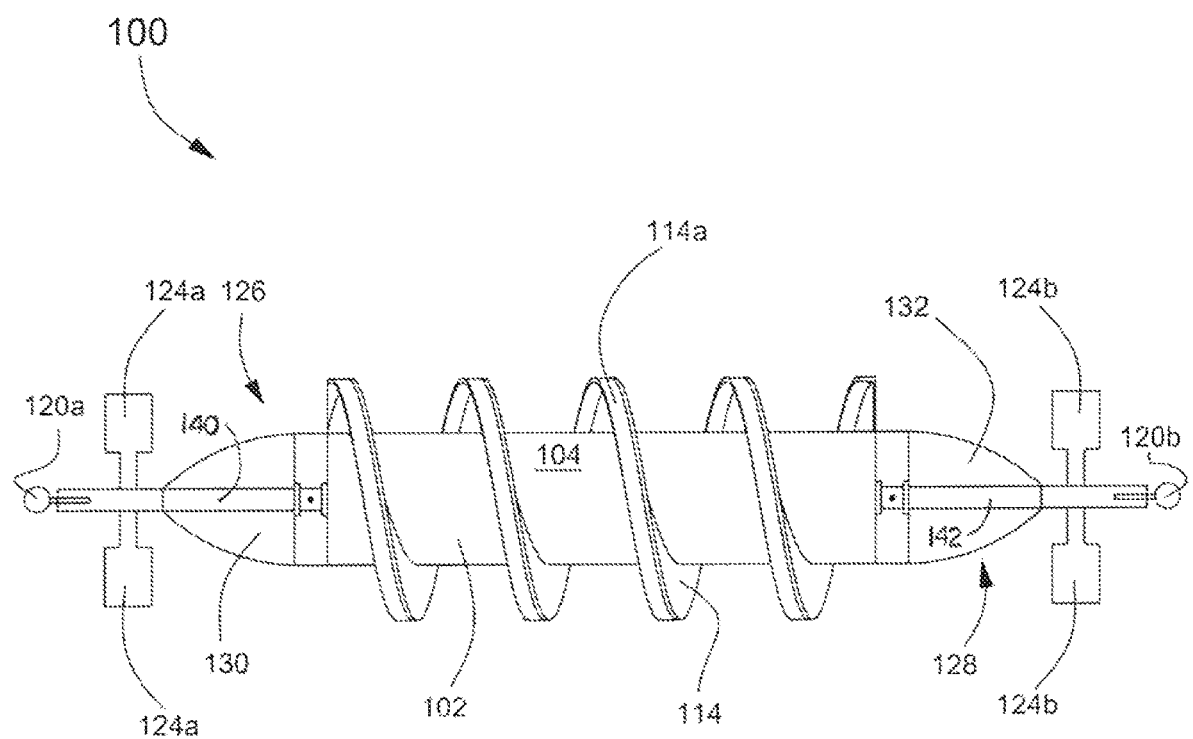
FIG. 1A illustrates a top view of a hydro power generating device, in accordance with an embodiment of the present invention.
Figure 1B:
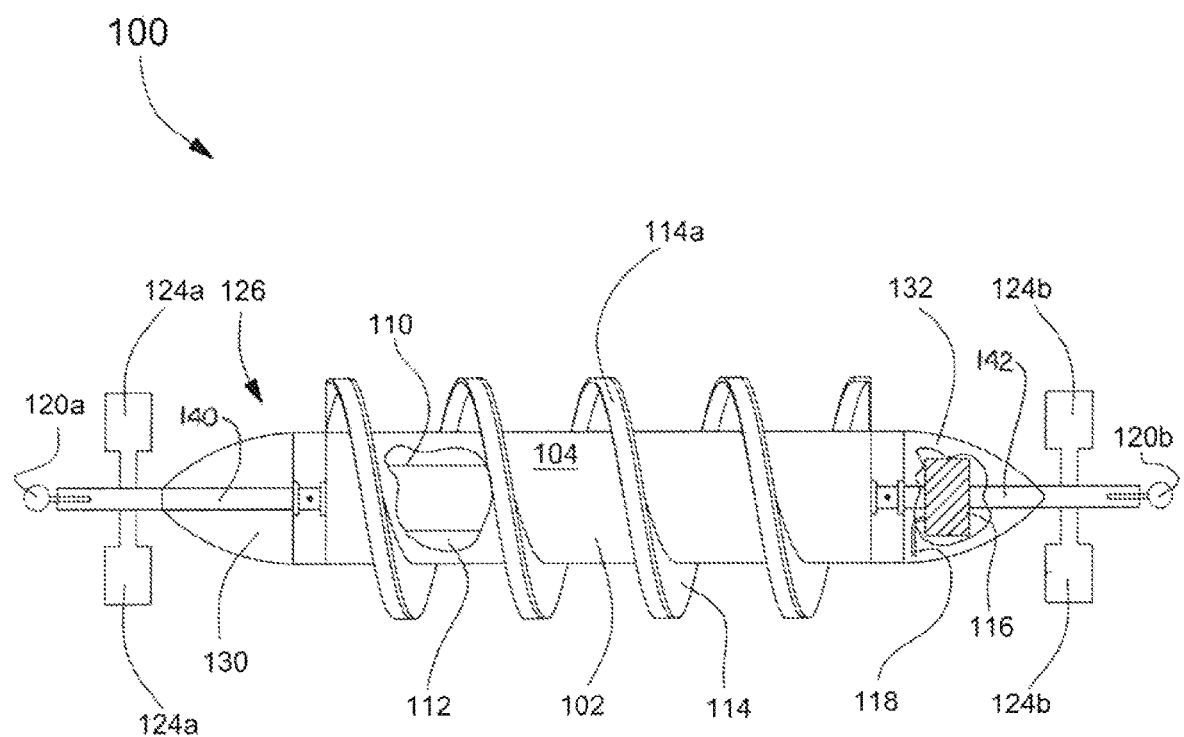
FIG. 1B illustrates a cutout view showing internal parts the hydro power generating device as shown in FIG. 1A, in accordance with an embodiment of the present invention.

According to one embodiment of the present invention as shown in FIG. 1A-B, a hydro power generating device 100 that consists of an elongated cylindrical hull 102 to which a helical screw such as a typical Archimedes screw 114 is attached, ringing the outer surface 104 of the hull 102. The Archimedes screw 114 may, in some applications, incorporate a turbulence reduction ring 114A, which is installed at an approximate 90-degree angle to the surface of the flight. Its purpose is to reduce fluid turbulence losses, prevent overflow at the edge of the screw and to prevent contact between the moving edges and the aquatic life. Movement of water against the screw 114 causes the hull 102 to rotate. The power created by the rotation of the hull 102 is transferred to a generator 116 affixed to the hull 102, According to another embodiment, two or more of the devices 100 are connected to each other through one or more external frameworks 122a-b (FIG. 2) to form a hydro power generating system 200. The hull 102 of each device 100 serves as a structural member, connecting the frame element located at both ends of the hulls. Further the hull 102 serves as water ballast tank 112 and contains a compressed air source in an air tank 110 to provide buoyancy of the device 100 allowing it to rise to the water surface.

Figure 2:
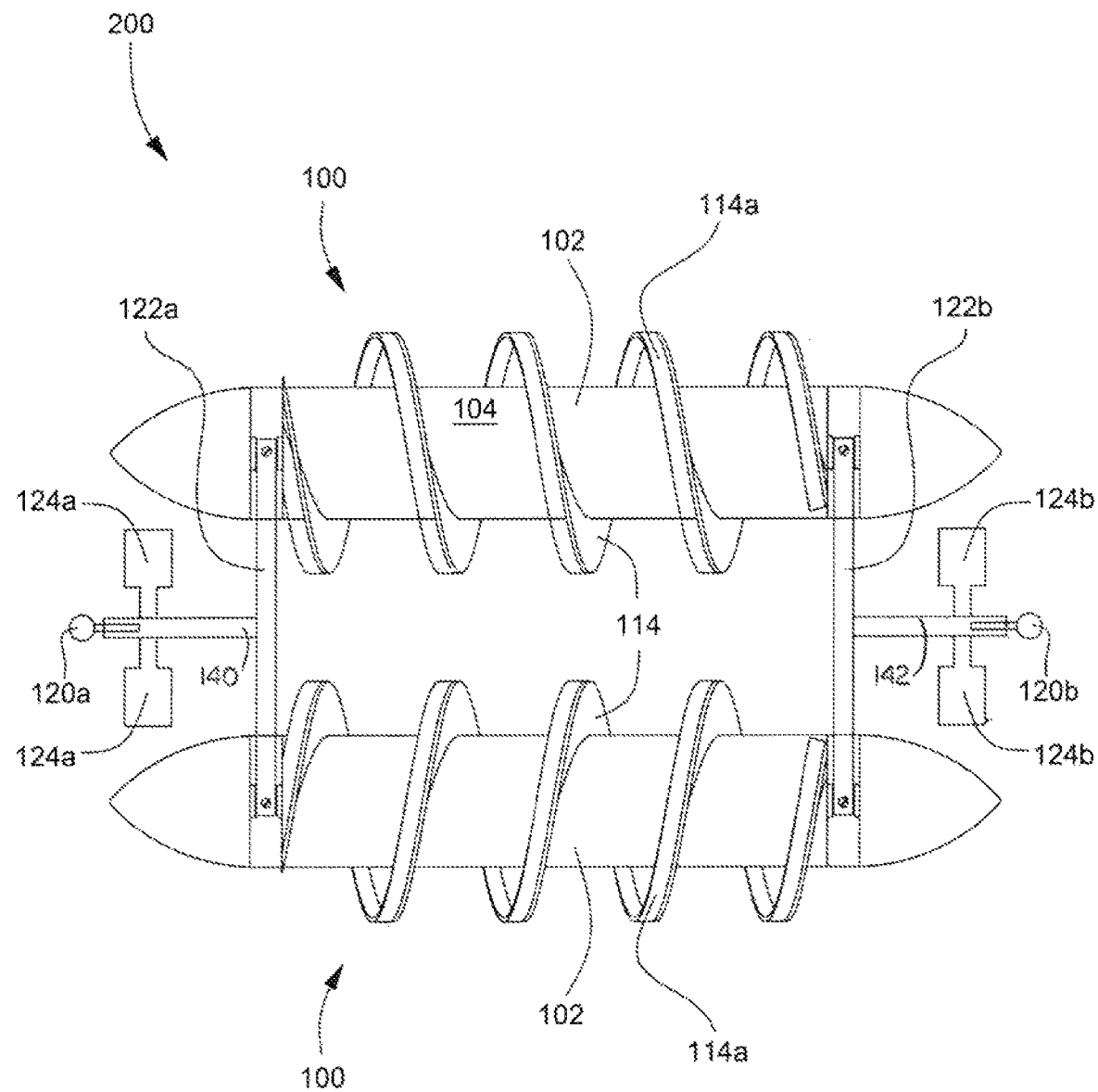
FIG. 2 illustrates a top view of a hydro power generating system comprising two hydro power generating devices in parallel via a common frame, in accordance with an embodiment of the present invention.

According to another embodiment of the present invention, as shown in FIG. 2, a hydro power generating system 200 comprises at least a pair of hydro power generating devices 100 connected in parallel, wherein the system 200 comprising at least a pair of counter-rotating hulls 102 with helical screws 114. The devices 100 are attached to one or more common frames 122a-b, wherein the frame 122 has at least an anchor point 120a-b at each end (126, 128) of the device 100 which allows it to be anchored or tethered at both ends, allowing the device 100 to produce power when the water flow is reversed (as in tidal flow) and further the device 100 so that the axis of the turbines remain parallel to the vertical and/or horizontal direction of the water flow. Additionally, it allows the entire assembly of the system 200 to easily and quickly anchored and/or tethered in flowing water.

According to one aspect of the present invention a hydro power generating device 100, shown in FIG. 1, comprises an elongated cylindrical hull 102 having an outer surface 104 defining an interior cylindrical space; an air tank 110 mounted in the interior cylindrical space of the hull 102 along its longitudinal axis, wherein the air tank 110 comprises compressed air; a water ballast tank 112, wherein the water ballast tank 112 comprises water at the space around the air tank 110 and the interior cylindrical space of the hull 102, whereby the volume of water in the water ballast tank 112 is adjustable to provide positive buoyancy during installation and removal, and neutral buoyancy during power generation operation; a helical screw 114 attached along the length of the outer surface 104 of the elongated hull 102, wherein the helical screw 114 allows the hull 102 to rotate with movement of water; and a generator 116 connected to the hull 102, wherein the rotation of the hull 102 is transferred to the generator 116 to generate electric power.

In another aspect as shown in FIG. 1A-B, the helical screw 114 is an Archimedes type screw.

In another aspect as shown in FIG. 2, the device 100 is configured to generate electrical power in forward and reverse flow (tidal flow) direction of water.

In another aspect, alternatively, the device 100 and system 200 are adapted to power a pump to deliver water to a separate location, for example for the purpose of irrigation.

In another aspect as shown in FIG. 1B, the buoyancy of the hull 102 is adjusted by controlling the volume of water in the water ballast tank 112 and the volume of the compressed air in the air tank 110.

In another aspect, the generator 116 connected to the hull 102 of the device 100 is a geared generator.

In another aspect, an electrical power outlet 118 connected to the generator 116 of the device 100 to allow transmission of the generated electric power.

In another aspect, the device comprises a first end 126 and a second end 128 that remain stationary while the hull 102 between the first end 126 and the second end 128 rotates with the movement of water.

In another aspect, at least one horizontal adjustable stabilizing fin and one vertical adjustable stabilizing fin 124a-b are attached to the first end 126 and second end 128 of the device 100 to stabilize oscillation of the device 100. A first anchor shaft 140 and a second anchor shaft 142 may be provided at the first end 126 and the second end 128, respectively, of the device 100. At least one pair of horizontal adjustable stabilizing fins 124a may extend outwardly from the first anchor shaft 140. At least one pair of vertical adjustable stabilizing fins 124b may extend outwardly from the second anchor shaft 142 at the first end 126 and the second end 128, respectively, of the device 100 to stabilize oscillation of the device 100.

In another aspect, at least one anchor point 120a-b is attached to the first end 126 and second end 128 of the device 100 as a means of holding the device 100 vertically and/or horizontally parallel to the water flow. Further the anchor points 120a-b to facilitate installation and deinstallation of the device 100 on water surface.

In another aspect, the screw 114 comprises a turbulence reduction ring 114A orthogonally attached to the edge of the screw 114.

In another aspect as shown in FIG. 2, a hydro power generating system 200, wherein the system 200 comprises: at least two elongated counter rotating cylindrical hulls 102 connected in parallel via at least one common frame 122*a-b*, wherein each of the hulls 102 is having an outer surface 104 defining an interior cylindrical space; at least a pair of adjustable horizontal and vertical stabilizing fins 124*a-b* are attached to the common frame 122*a-b* of the system 200 to control horizontal and vertical movement of the system 200 to stabilize oscillation of the hulls 102; an air tank 110 mounted coaxially at the interior cylindrical space of each of the hulls along their longitudinal axes, wherein the air tank 110 comprises compressed air; a water ballast tank 112, wherein the water ballast tank 112 comprises water at the space around the air tank 110 and the interior cylindrical space of each of the hulls 102; at least one helical screw 114 attached to outer surface 104 of each of the hulls 102 and extending along the length of the elongated hulls 102, wherein the helical screw 114 causes each of the hulls 102 to rotate with movement of water; a generator 116 connected to the hulls 102 through thrust bearings, wherein the rotation of each of the hulls 102 is transferred to the respective generator 116 to generate electric power; and an electrical power outlet 118 connected to the generator 116 of each of the hulls 102 to allow transmission of the generated electric power.

In another aspect as shown in FIG. 2, at least one anchor point 120*a-b* connected to the common frame 122*a-b* of the hydro power generating system 200 to facilitate installation and deinstallation of the system 200.

In another aspect as shown in FIG. 2, each of the helical screws 114 of the hydro power generating system 200 is an Archimedes type screw.

In another aspect, the at least two counter rotating hulls 102 are attached to the common frame 122*a-b* thereby allowing the system 200 to generate electrical power in forward and reverse flow (tidal flow) direction of water.

In another aspect, the buoyancy of the hull 102 is adjusted by controlling the volume of water in the water ballast tank 112 and the volume of the compressed air in the air tank 110.

In another aspect, each of the generators 116 of the hydro power generating system 200 is a geared generator.

In another aspect, the system comprises a first end 126 and a second end 128 that remain stationary allowing to connect adjacent hulls via the common frame 122*a-b* of the system 200.

In another aspect, the adjustable stabilizing fins 124*a-b* are attached to the first end 126 and second end 128 of the common frame 122*a-b* of the system 200.

In another aspect, the anchor points 120*a-b* are attached to the first end 126 and the second end 128 by the common frame 122*a-b* of the system 200.

According to an embodiment of the present invention, a top view of a hydro power generating device 100 as shown in FIG. 1A, the hydro power generating device 100, comprises an elongated cylindrical hull 102 having an outer surface 104 defining an interior cylindrical space. The rotatable cylindrical hull 102 is positioned between a first end 126 and a second end 128 of the device 100, wherein a stationary head 130 attached to the first end 126 of the device 100 and a stationary tail portion 132 attached to the second end 128 of the device 100 allowing attachment of a stabilizing fin 124*a-b* to the first end 126 and the second end 128 to stabilize oscillation of the device 100 when placed in flowing water, further anchors 120*a-b* attached to the first end 126 and the second end 128 allowing to position the device 100 in alignment with the water flow to facilitate quick and easy installation and deinstallation of the device 100. An electrical power outlet 118 connected with the generator 116 is allowed to pass through the common frame 122*a-b* to allow transmission of the generated electric power to a distribution grid or storage battery.

According to another embodiment of the present invention as shown in FIG. 1B, a cutout view showing internal parts the hydro power generating device as shown in FIG. 1A, the hydro power generating device 100 comprises the elongated cylindrical hull 102 having an outer surface defining an interior cylindrical space along longitudinal axis of the hull 102; an air tank 110 mounted coaxially within the hull 102, wherein the air tank 110 comprises compressed air. The volume of the compressed air in the air tank 110 can be controlled. Further a water ballast tank 112 is positioned around the air tank 110. According to an exemplary embodiment, the water ballast tank 112 is the space between the air tank 110 and the interior cylindrical space of the hull 102, whereby the water ballast tank 112 contains water, wherein the volume of water in the water ballast tank 112 is adjustable. The buoyancy of the hull 102 is adjusted by controlling the volume of water in the water ballast tank 112 and the volume of the compressed air in the air tank 110, thereby allowing the device 100 to render positively or negatively buoyant. According to another embodiment, a helical screw 114 attached along the length of elongated outer surface 104 of the hull 102, wherein the helical screw 114 allows the hull 102 to rotate with movement of water. Further a generator 116 connected to the hull 102, wherein the generator 116 converts the rotational force of the hull 102 into electric energy.

According to another embodiment of the present invention as shown in FIG. 2, a hydro power generating system 200 comprises at least two devices 100 having elongated counter rotating cylindrical hulls 102 connected in parallel via a common frame 122*a-b*. Further at least a pair of adjustable stabilizing fins 124*a-b* attached to both ends of the common frame 122*a-b* of the system 200 to control horizontal and vertical movement of the system 200 to stabilize oscillation of the hulls 102. Anchor points 120*a-b* attached to the opposite ends of the common frame 122*a-b* of the system 200 to maintain the position of the device 100 in optimal orientation with regard to the movement of the water to facilitate quick and easy installation and deinstallation of the system 200.

According to another exemplary embodiment, a top view of a hydro power generating system 200 comprising two hydro power generating devices 100 in parallel connected via a common frame 122*a-b* as shown in FIG. 2, each of the hulls 102 of the system 200 is having an outer surface 104 and an interior cylindrical space. An air tank 110 mounted coaxially around the longitudinal axis of each of the hulls 102, wherein the air tank 110 is loaded with compressed air. Further a water ballast tank 112 is positioned around the air tank 110 and the interior cylindrical space of each of the hulls 102. The water ballast tank 112 contains water, wherein the volume of water in the water ballast tank 112 is adjustable. The buoyancy of the hull 102 is adjusted by controlling the volume of water in the water ballast tank 112 and the volume of the compressed air in the air tank 110, thereby allowing the system 200 to render positively or negatively buoyant. According to another exemplary embodiment, each of the device 100 of the system 200, further comprises at least one helical screw 114 attached to outer surface 104 of each of the hulls 102 and extending along the length of the elongated hulls 102, wherein the helical screw 114 allows each of the hulls 102 to rotate with movement of water, wherein the screw 114 comprises a turbulence reduction ring 114A orthogonally attached to the edge of the screw 114. Its purpose is to reduce fluid turbulence losses, prevent overflow at the edge of the screw and to prevent contact between the moving edges and the aquatic life. Further a generator 116 is connected to each of the hulls 102, wherein the rotation of each of the hulls 102 is transferred to the respective generator 116 to generate electric power and an electrical power outlet 118 connected to the generator 116 of each of the hulls 102 to allow transmission of the generated electric power.

Figure 3:
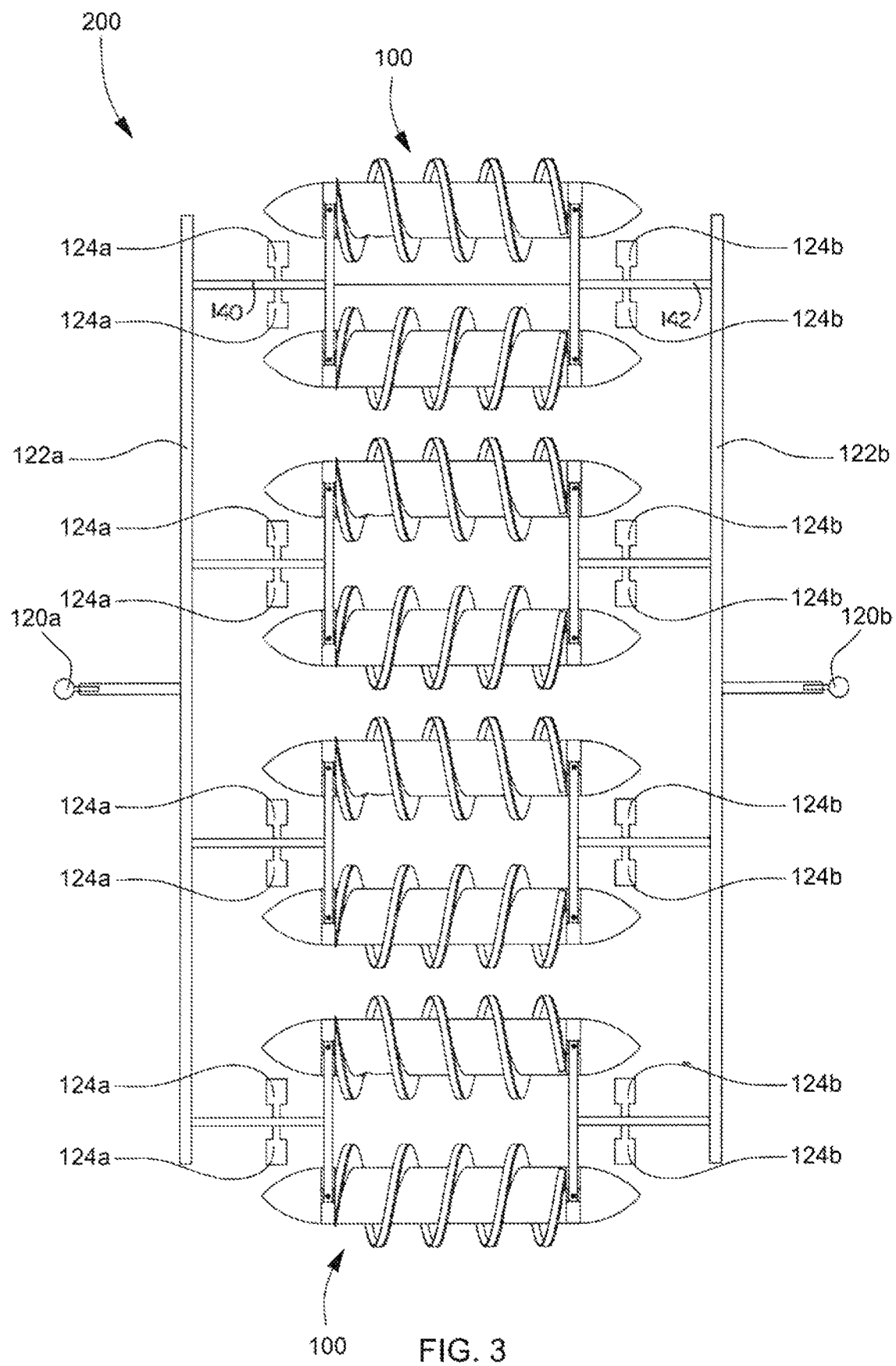
FIG. 3 illustrates a top view of a hydro power generating system comprising pluralities of hydro power generating devices via a common frame, in accordance with an embodiment of the present invention.

According to another embodiment of the present invention as shown in FIG. 3, a plurality of hydro power generating device 100 are connected in parallel and series to form a large hydro power generating system 200, that can be adapted for use in a number of applications based on water flow; streams, rivers, canals, tidal flows and ocean currents or over other flowing water bodies to generate and supply large amount of electric energy also the system 200 and devices 100 of the present invention are configured to be used for the purpose of irrigation.

According to another embodiment, the device 100 and system 200 of the present invention is not harmful to aquatic life.

According to another embodiment, the device 100 and system 200 of the present invention is configured to produce electrical power from water, alternatively flowing in opposite directions (tidal flow).

According to another embodiment, the device 100 and system 200 of the present invention is configured to be coupled to adjacent units in an array that can extend longitudinally, laterally and/or vertically.

According to another embodiment, the device 100 and the system 200 of the present invention is relatively simple, economical, and easy to construct. Further it is easy to install, remove and maintain as only an anchor point 120a-b or tethering system is required for installation of the device 100 and/or the system 200.

According to another exemplary embodiment, the device 100 and the system 200 of the present invention is strategically used for irrigation purpose as well while generating electricity.

Because many modifications, variations, and changes in detail can be made to the described preferred embodiments of the invention, it is intended that all matters in the above description and shown in the accompanying drawings be interpreted as illustrative and not in a limiting sense. Thus, the scope of the invention should be determined by the appended claims and their legal equivalence.

What is claimed is:

1. A hydro power generating device, comprising:
   a first anchor shaft and a second anchor shaft at first and second ends, respectively, of the device;
   at least one pair of horizontal adjustable stabilizing fins extending outwardly from the first anchor shaft and at least one pair of vertical adjustable stabilizing fins extending outwardly from the second anchor shaft at the first and second ends, respectively, of the device to stabilize oscillation of the device;
   an elongated cylindrical hull rotatable between the first anchor shaft and the second anchor shaft, the elongated hull having an outer surface defining an interior cylindrical space;
   an air tank mounted coaxially at the interior cylindrical space of the hull along its longitudinal axis, wherein the air tank comprises compressed air;
   a water ballast tank, wherein the ballast tank comprises water at the space around the air tank and the interior cylindrical space of the hull, whereby the volume of water in the water ballast tank is adjustable;
   a helical screw attached along the length of the outer surface of the elongated hull, wherein the screw allows the hull to rotate with movement of water; and
   a generator connected to the hull, wherein the rotation of the hull is transferred to the generator to generate electric power.

2. The hydro power generating device of claim 1, wherein the helical screw is an Archimedes type screw.

3. The hydro power generating device of claim 1, wherein the device is configured to generate electrical power in forward and reverse flow direction of water, further the device is adapted to power a pump to deliver water to another location.

4. The hydro power generating device of claim 1, wherein the buoyancy of the hull is adjusted by controlling the volume of water in the water ballast tank and the volume of the compressed air in the air tank.

5. The hydro power generating device of claim 1, wherein the generator is a geared generator.

6. The hydro power generating device of claim 1, wherein an electrical power outlet connected to the generator of the device to allow transmission of the generated electric power.

7. The hydro power generating device of claim 1, wherein the first end and the second end of the device remain stationary while the hull between the first end and the second end of the device rotates with the movement of water.

8. The hydro power generating device of claim 7, further comprising a stationary head on the first anchor shaft and a stationary tail portion on the second anchor shaft, and wherein the hull is rotatable between the stationary head and the stationary tail portion.

9. The hydro power generating device of claim 7, wherein at least one anchor point is attached to the first anchor shaft and the second anchor shaft to either or both ends of the device to facilitate installation and deinstallation of the device.

10. The hydro power generating device of claim 1, wherein the screw comprises a turbulence reduction ring orthogonally attached to the edge of the screw.

11. A hydro power generating system, comprising:
   at least two hydro power generating devices including at least two elongated counter rotating cylindrical hulls, respectively, connected in parallel via at least one common frame, wherein each of the hulls is having an outer surface defining an interior cylindrical space;
   a first anchor shaft and a second anchor shaft at first and second ends, respectively, of each of the at least two hydro power generating devices, the first anchor shaft and the second anchor shaft attached to the at least one common frame;
   at least a pair of adjustable horizontal and vertical stabilizing fins extending outwardly from the first anchor shaft and the second anchor shaft, respectively, the fins thereby positioning the hulls in alignment with respect to water flow to control horizontal and vertical movement of the system to stabilize oscillation of the hulls;
   an air tank mounted coaxially at the interior cylindrical space of each of the hulls along their longitudinal axes, wherein the air tank comprises compressed air;

a water ballast tank, wherein the ballast tank comprises water at the space around the air tank and the interior cylindrical space of each of the hulls;

at least one helical screw attached to outer surface of each of the hulls and extending along the length of the elongated hulls, wherein the helical screw causes each of the hulls to rotate with movement of water;

a generator connected to each of the hulls, wherein the rotation of each of the hulls is transferred to the respective generator to generate electric power; and an electrical power outlet connected to the generator of each of the hulls to allow transmission of the generated electric power.

12. The hydro power generating system of claim 10, wherein at least one anchor point connected to the common frame to facilitate installation and deinstallation of the system.

13. The hydro power generating system of claim 10, wherein the helical screw is an Archimedes type screw.

14. The hydro power generating system of claim 10, wherein the at least two counter rotating hulls are attached to the common frame thereby allowing the system to generate electrical power in forward and reverse flow direction of water, further the system is adapted to power a pump to deliver water to another location.

15. The hydro power generating system of claim 10, wherein the buoyancy of the hull is adjusted by controlling the volume of water in the water ballast tank and the volume of the compressed air in the air tank.

16. The hydro power generating system of claim 10, wherein the generator is a geared generator.

17. The hydro power generating system of claim 10, wherein the first end and the second end of the each of the at least two hydro power generating devices remain stationary allowing to connect adjacent hulls via the common frame of the system.

18. The hydro power generating system of claim 10, further comprising a stationary head on the first anchor shaft and a stationary tail portion on the second anchor shaft, and wherein each of the at least two elongated counter rotating cylindrical hulls is rotatable between each corresponding one of the stationary head and the stationary tail portion.

19. The hydro power generating system of claim 10, wherein at least one anchor point is attached to the first anchor shaft and the second anchor shaft.

20. The hydro power generating system of claim 11, wherein the screw comprises a turbulence reduction ring orthogonally attached to the edge of the screw.

* * * * *